United States Patent [19]

Ley et al.

[11] Patent Number: 4,528,320

[45] Date of Patent: Jul. 9, 1985

[54] LOW TEMPERATURE, MOISTURE CURE COATING COMPOSITION

[75] Inventors: David A. Ley, Stamford, Conn.; Susan M. Cady, Yardley, Pa.

[73] Assignee: American Cyanamid Co., Stamford, Conn.

[21] Appl. No.: 529,236

[22] Filed: Sep. 6, 1983

[51] Int. Cl.$^3$ .................. C08J 39/00; C08K 39/00
[52] U.S. Cl. .................. 524/555; 525/328.2; 525/379; 525/381; 525/382; 526/304
[58] Field of Search .................. 525/328.2, 379, 381, 525/382; 524/555; 526/304

[56] References Cited

U.S. PATENT DOCUMENTS 4,303,563  12/1981  Emmons et al. ............. 525/328.2 X
4,446,280   5/1984  Cady et al. .................. 525/186

Primary Examiner—Paul R. Michl
Assistant Examiner—S. Babajko
Attorney, Agent, or Firm—Steven Hultquist; Henry C. Jeanette

[57] ABSTRACT

A low temperature, moisture cure coating composition is provided. The coating composition, which is shelf stable, includes a crosslinkable, solvent borne, solution polymer containing certain activated ester groups, and a ketimine. Also provided is a crosslinked coating obtained by curing the composition.

10 Claims, No Drawings

LOW TEMPERATURE, MOISTURE CURE COATING COMPOSITION

TECHNICAL FIELD

This invention relates to low temperature cure thermoset resins. More particularly, this invention relates to a moisture cure coating composition based upon a crosslinkable, solvent borne, solution polymer containing activated ester groups, mixed with a blocked crosslinking agent. The present invention further relates to a crosslinked coating formed from the composition.

BACKGROUND ART

Low temperature cure coating compositions based on crosslinkable, solvent borne, solution polymers containing activated ester groups, as illustrated by U.S. patent application Ser. No. 346,329, filed Feb. 5, 1982, now abandoned and U.S. patent application Ser. No. 377,504, filed May 12, 1982, now U.S. Pat. No. 4,446,280 are known to us. In a coating composition of this type, the coating composition must be supplied as a two component system, and coatings must be prepared within minutes of mixing the polymer with the crosslinking agent. It is known, as exemplified by *Chem. Abstracts* 93: 205,753q (1980), that a system with good storage stability is formed by the admixture of a ketimine with an epoxy polymer, but epoxy systems suffer from poor exterior durability.

Hence, there is a need for a low temperature cure, one component, solvent borne coating composition containing activated ester groups. Such a coating composition would be shelf-stable. Therefore, the provision of such a coating composition would constitute a significant advance in the art.

SUMMARY OF THE INVENTION

It is accordingly an object of the present invention to provide a low temperature cure, one component, solvent borne coating composition containing activated ester groups.

A further object is to provide a crosslinked coating obtained by curing a composition of this type.

Additional objects, advantages and novel features of the invention will be set forth in the description which follows, and in part will become apparent to those skilled in the art upon examination of the following or may be learned by practice of the invention.

To achieve the foregoing objects and in accordance with the purpose of the present invention, as embodied and broadly described herein, there is provided a low temperature, moisture cure coating composition. This coating composition includes a particular crosslinkable, solvent borne, solution polymer, and a certain ketimine. The polymer contains from about 1 to 100 wt. % of repeating units derived from an activated ester-containing vinyl monomer of the formula

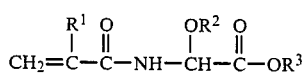

in which the $R^1$ group is selected from H and $CH_3$, and the $R^2$ and $R^3$ groups are independently selected from alkyls of 1–6 carbon atoms, cycloalkyls of 5–6 carbon atoms, and 2-hydroxyalkyls of 2–6 carbon atoms. Any balance of repeating units making up the polymer is derived from one or more copolymerizable ethylenically unsaturated comonomers.

The ketimine is made from a ketimine-forming ketone and a crosslinking agent. The crosslinking agent has a plurality of primary amine groups, each capable when in the free amine form of replacing the $OR^3$ moiety by nucleophilic substitution. The crosslinking agent is present in an amount sufficient to produce a crosslinked polymer when in the free amine form. The coating composition, as just indicated, contains the crosslinking agent in the form of the ketimine. This moisture cure, solvent borne coating composition is shelf stable, typically for more than about two months, and thereby makes possible a one component coating composition.

Also provided by the present invention is a crosslinked coating obtained by curing the composition. The coating has good film properties, humidity and water resistance.

DETAILED DESCRIPTION

In the present invention, crosslinking utilizes the reaction between an activated ester group and a nucleophilic primary amine. The activated ester group and the amine react very rapidly in solvent borne coating systems. Accordingly, as explained earlier, prior art, solvent borne coating compositions containing activated ester groups were supplied as a two component system, and were characterized by a rather short pot life. We have discovered that by blocking the nucleophilic primary amine groups through the formation of ketimines therefrom, a one component, solvent borne coating composition is provided. This coating composition cures on exposure to atmospheric moisture, which hydrolyzes the ketimines to unblock the nucleophilic primary amine groups for reacting with the activated ester groups, as a result of which the polymer is crosslinked. The significance of the discovery becomes plain when it is considered that in the prior art, solvent borne coating systems described above, the reaction is so rapid that coatings must be prepared within minutes of mixing the reactants; whereas, in the moisture cure compositions of the present invention, formulations can be prepared that, on the one hand, are stable for more than about two months, and yet, on the other hand, still can undergo crosslinking within hours under ambient cure conditions. Thus, the moisture cure coating composition of the present invention makes commercially practicable a one component, solvent borne coating composition.

The essential components of the composition of the present invention include a solvent borne, solution polymer bearing particular activated ester groups, and a certain ketimine. A necessary feature of the polymer is the presence of from about 1 to 100 wt. % of repeating units derived from an activated ester group-containing vinyl monomer of the formula

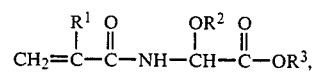

in which the $R^1$ group is selected from H and $CH_3$, and the $R^2$ and $R^3$ groups are independently selected from alkyls of 1–6 carbon atoms, cycloalkyls of 5–6 carbon atoms, and 2-hydroxyalkyls of 2–6 carbon atoms. It is preferred for the polymer to contain about 20–35 wt. % of these repeating units.

Suitable monomers include methyl acrylamidoglycolate methyl ether (MAGME), ethyl acrylamidoglycolate ethyl ether, butyl acrylamidoglycolate butyl ether, methyl acrylamidoglycolate ethyl ether and ethyl acrylamidoglycolate methyl ether, with MAGME being preferred. Of course, the monomer could be a mixture of monomers such as a mixture of MAGME, butyl acrylamidoglycolate methyl ether, methyl acrylamidoglycolate butyl ether and butyl acrylamidoglycolate butyl ether, with, for example, the major portion of the mixture being MAGME with an overall methyl/butyl ratio of about 3:1. A highly preferred polymer contains about 20–35 wt. % of repeating units derived from MAGME.

These monomers are suitably formed by the procedures set forth in U.S. patent application Ser. No. 346,329, which is discussed earlier, U.S. patent application Ser. No. 377,505, filed May 12, 1982, now U.S. Pat. No. 4,443,623 and U.S. patent application Ser. No. 377,506, also filed May 12, 1982, the monomer-forming procedures of which are hereby incorporated by reference into this description. Additionally, attention is invited to two illustrative procedures set forth later in the description of the present invention.

The ketimine is formed from a certain type of ketone and from a crosslinking agent having a plurality of primary amine groups, each capable when in the free amine form of replacing the $OR^3$ moiety by nucleophilic substitution. The ketone must be sterically capable of forming the ketimine and preferably volatilizes under low temperature cure conditions. Typical low to moderate boiling, branched or unbranched ketones are suitable, with the unbranched ketones being preferred. Exemplary ketones include acetone, methyl ethyl ketone, methyl butyl ketone, methyl isobutyl ketone, methyl amyl ketone, cyclohexanone, and 4-heptanone.

Conveniently, the crosslinking agent has two to four nucleophilic primary amine groups, with a crosslinking agent having two of these amine groups being typical. Formulated systems containing a diketimine have remained fluid for more than two months in a closed container. Illustrative amines include 1,3-bis(aminomethyl)cyclohexane, 1,4-bis(aminomethyl)-cyclohexane, m-xylenediamine, 1,3-propanediamine, 1,6-hexanediamine, 4,7-dioxodecane-1,10-diamine, 1,2-cyclohexanediamine, bis(3-aminopropyl)diethylene glycol, and an amine-terminated triazine resin.

The triazine resin is conveniently obtained according to the procedures set forth in U.S. patent application Ser. No. 377,504, filed May 12, 1982, the triazine resin-forming procedures of which are hereby incorporated by reference into this description. In this regard, the resin is obtained by either melt condensation of the aminotriazine compound with the amine in the presence of an acid catalyst at temperatures of 120° to 250° C. or by reaction of the chloride (such as cyanuric chloride) with the amine in the presence of an acid scavenger. Examples are given in U.S. 2,393,755 and in E. M. Smolin and L. Rapport, "s-Triazine and Derivatives" in "The Chemistry of Heterocyclic compounds, a series of Monographs", A. Weissberger, Editor, Interscience Publishers, Inc., New York, 1959.

A later invention of which we are aware, which is disclosed and claimed in copending application U.S. Ser. No. 529,234, filed Sept. 6, 1983 in the name of Roland DiLeone, is directed to a sterically unhindered, trifunctional primary amine crosslinking agent such as N,N'-bis(6-aminohexyl)-2-[(6-aminohexyl)amino] butanediamide. As disclosed and claimed in copending application U.S. Ser. No. 529,233, filed Sept. 6, 1983, now U.S. Pat. No. 4,495,366, in the names of D.A. Ley and H. Burkhard, this compound is best prepared by the following procedure: Dimethyl maleate (72 g., 0.5 moles) is added over a 2–3 hour period to a solution of 1,6-hexanediamine (174 g., 1.5 moles) in toluene (360 g.) at 75°–80° C. The reaction temperature rises from 80° to 110° C. under reflux conditions. After the addition is completed, methanol is distilled at a reaction temperature of 120°–125° C. Additional toluene (320 g.) is added to maintain reaction volume. The reaction may be followed by amine titration or by disappearance of the methyl ester in the $^1$H NMR spectrum. After the reaction is complete, toluene is removed under vacuum (50°–70° C., 15–20 mm. Hg) to give the desired compound as a viscous liquid which solidifies on standing.

The crosslinker is employed in the composition in an amount sufficient to create a crosslinked polymer, when the nucleophilic primary amine groups thereof are in the free amine form. The coating composition, of course, contains the crosslinking agent in the form of the ketimine. The amount of the crosslinker may vary widely and is generally determined by a number of factors such as the extent of crosslinking desired and the particular reactants employed. Generally, the primary amine groups of the crosslinker in the composition will range from about 0.5 to 2 equivalents based on the activated ester functionality of the polymer employed. Preferably, about 0.8 to 1.2 equivalents of amine groups are used.

The ketone and the crosslinker may be reacted to form the ketimine in a ratio ranging from about 1:1 to about 10:1 equivalents of the ketone to the crosslinker, with an about 2:1 to 3:1 ratio being convenient.

As explained, the polymer contains from about 1–100 weight percent of repeating units derived from the activated ester-containing vinyl monomer. Any balance of repeating units is derived from one or more copolymerizable ethylenically unsaturated monomers. Such monomers include $C_1$–$C_{18}$, preferably $C_1$–$C_8$, alkyl esters of acrylic acid, $C_1$–$C_{18}$, preferably $C_1$–$C_8$, alkyl esters of methacrylic acid, styrene, acrylonitrile, maleic and fumaric acids, and functional acrylates such as 2-hydroxyethylacrylate, acrylic acid and acrylamide.

Conveniently, the activated ester-containing monomer may be polymerized, or more preferably copolymerized with these other monomers, by the polymerization techniques set forth in U.S. patent application Ser. No. 377,504, which is discussed earlier, the polymer-forming procedures of which are hereby incorporated by reference into this description. Attention is also invited to the illustrative procedures set forth below in the description of the present invention.

The coating composition of the present invention is conveniently made by reacting the ketone with the crosslinker to form the ketimine, and then combining the ketimine with the crosslinkable polymer. Conventional procedures are used for ketimine formation.

The crosslinkable polymer is cured by reaction with the unblocked crosslinking agent described earlier, under low temperature cure conditions. By "low temperature" is meant from about ambient temperature up to and including about 50° C., and, in certain instances, up to and including about 100° C.

The moisture cure composition of the present invention is readily cured as a coating, by exposure to moisture at an appropriate low temperature for an adequate period of time. There is an advantage in curing the coating for about 20 minutes at about 50° to 70° C. This mild cure gives a tack-free film which can continue to post-cure at ambient temperature to give full film properties. The speed of curing depends upon factors including the particular temperature at which curing is carried out, the components forming the composition, and the presence or absence of an accelerator. The unbranched ketones such as methyl ethyl ketone will provide a faster cure response as measured by solvent resistance and film hardness.

The composition of the present invention may contain such other ingredients as are customarily employed in coating compositions. Such ingredients include polymer solvents, and flow additives and modifiers.

Our low temperature, moisture cure composition is useful as a general purpose coating, as well as a coating in automotive, wood, decorative, textile and paper applications. As automotive coatings, the composition may be used as topcoat and repair coatings. The composition is particularly useful where a one component coating system is desired or required. The low temperature cure aspect allows painting of parts which cannot be baked because either of size or sensitivity to heat. The system also avoids the toxicity problems inherent in using isocyanate-based crosslinking agents.

In the illustrative procedures which follow, all parts and percentages are by weight unless otherwise specified.

Preparation of Activated Ester Group-Containing Monomers

Preparation of Methyl Acrylamidoglycolate Methyl Ether (MAGME)

To a three-necked flask equipped with a stirrer and an extractor filled with a molecular sieve drying agent is added 300 parts acrylamidoglycolic acid, 3000 parts methanol, 0.05 parts phenothiazine, 4.5 parts 98% sulfuric acid and 200 parts chloroform. The mixture is heated to reflux and the distillate is allowed to pass through the extractor for 6½ hours. The mixture is cooled and allowed to stand for 16 hours at which point the mixture is warmed to about 40° C., 19 g. of sodium carbonate is added, and the solution is stirred for 2½ hours. The mixture is filtered and vacuum stripped of solvent. The solid residue is extracted with chloroform. Diethyl ether is added to the extract and a polymeric mass precipitates which is discarded. The remaining extract is stripped of solvent to yield 264.2 parts of crude MAGME.

Preparation of Butyl Acrylamidoglycolate Butyl Ether

One hundred parts of acrylamidoglycolic acid, 517 parts butanol, 1 part conc. sulfuric acid and 0.1 part monomethyl ether of hydroquinone are mixed in a flask equipped with a Dean Stark water trap and a stirrer. The mixture is heated until homogeneous. After 5–10 minutes, 100 ml. of toluene is added and the mixture is brought to reflux and held 5 hours until the theoretical amount of water is collected by azeotrope. The toluene and excess butanol are removed under vacuum to yield 173 parts of the crude product.

Preparation of Ketimines

Ketimine A

An amine-terminated triazine resin (EW=287) in the amount of 287 parts is added to 300 parts of methyl isobutyl ketone. The reaction mixture is heated at 115°–120° C. until water stops distilling from the batch. Excess ketone is removed by distillation, and the mixture is cooled to room temperature to give a clear viscous yellow liquid. Infrared analysis shows no carbonyl is present. The product is then diluted to 42.8% solids with toluene.

Ketimine B 4,7-Dioxodecane-1,10-diamine in the amount of 44 parts is added to 125 parts of methyl isobutyl ketone and 23 parts of toluene. The reaction mixture is heated to reflux temperature under a nitrogen purge. The reaction is stopped when water ceases to distill from the reactor. Toluene and excess ketone are removed by distillation to give the product (87% solids).

Ketimine C 1,6-Hexanediamine in the amount of 202 parts is combined with 460 parts of methyl ethyl ketone and 400 parts of toluene. The reaction mixture is heated to reflux temperature under a nitrogen purge. The reaction is stopped when water no longer is distilled. Solvent and excess ketone are removed by distillation.

Ketimine D

A 50% by weight ethanol solution of N,N'-bis(6-aminohexyl)-2-[(6-aminohexyl)amino] butanediamide in the amount of 200 parts is added to 68 parts of methyl isobutyl ketone and 205 parts of toluene. The reaction mixture is heated to reflux temperature until water ceases to distill. Solvent is removed by distillation to give a viscous liquid which is diluted to 73% solids by the addition of absolute ethanol.

Preparation of Polymers

Polymer A

To a flask equipped with a stirrer, condenser, nitrogen inlet, dropping funnel and thermometer is added 37 parts of 2-ethoxyethanol. Methyl acrylamidoglycolate methyl ether (38.4 parts) is dissolved in 75 parts of 2-ethoxyethanol and then is added to a mixture of 57.6 parts butyl acrylate, 38.4 parts methyl methacrylate, 52.8 parts styrene, 48 parts acrylic acid, 4 parts n-dodecylmercaptan, and 4 parts di-t-butyl peroxide. The monomer mixture is filtered and then poured into the dropping funnel. The reactor is purged with nitrogen for 20 minutes, and the solvent heated to 135° C. The monomer mix is slowly added over a 4.5 hour period. The mixture is held at 135° C. for an additional 30 minutes and then cooled to room temperature. Dish solids (105° C.-2 hrs.) are 60.9% non-volatile.

Polymer B

The procedure used to form Polymer A is followed with these changes: methyl acrylamidoglycolate methyl ether, 42.5 parts; butyl acrylate, 52.2 parts; methyl methacrylate, 45.0 parts; styrene, 26.0 parts; acrylic acid, 4.3 parts; n-dodecylmercaptan, 1.3 parts; and t-butylperoctoate, 2.6 parts, are dissolved in 160 parts of a 40/60 solution of ethanol and toluene, and 16 parts of a 40/60 solution of ethanol and toluene are charged to the reactor. The monomer mixture is added over a 6 hour period while maintaining a reaction temperature of 82° C. The solution is heated for 12 hours at 82° C. after the monomer addition is complete. Dish solids for the polymer are 52.0% non-volatile.

Polymer C

The procedure used to make Polymer B is followed using the charge: methyl acrylamidoglycolate methyl ether, 33.2 parts; butyl acrylate, 66.4 parts; methyl methacrylate, 29.0 parts; styrene, 33.2 parts; acrylic acid, 4.2 parts; n-dodecylmercaptan, 1.66 parts, and t-butyl peroctoate, 3.32 parts, in 160 parts of 40/60 ethanol/toluene. Foil solids (45 min. at 45° C.) for the polymer are 56.3%.

EXAMPLE 1

8.74 Parts of Ketimine A (42.8% solution in toluene) is added to 15 parts of Polymer A. The mixture is cast onto pretreated steel panels and cured at the temperatures shown in the Table. Film properties are given in the Table.

EXAMPLE 2

Ketimine B in the amount of 14.8 parts is added to 20 parts of Polymer A. The mixture is cast onto pretreated steel panels and cured under the conditions shown in the Table. Film properties are set forth in the Table.

EXAMPLE 3

Ketimine C in the amount of 1.42 parts is added to 20 parts of Polymer B and 0.21 parts of 2-hydroxypyridine in 1.0 part ethanol. The mixture is cast onto pretreated steel panels and cured under the conditions set forth in the Table. Film properties are given in in the Table.

EXAMPLE 4

Ketimine D in the amount of 4 parts is added to 20 parts of Polymer C and 0.18 parts 2-hydroxypyridine in 1.0 part ethanol. The mixture is cast onto pretreated steel panels and allowed to cure for 10 days at ambient conditions. More than 200 methyl ethyl ketone double rubs are required to remove the coating.

| Example | Cure Conditions | | MEK Resistance* | | | Knoop Hardness | |
|---|---|---|---|---|---|---|---|
| | Temp. | Time | 1 day | 5 day | 14 day | 1 day | 14 day |
| 1 | RT | | — | 200 | — | — | 7.1 |
| | 50° C. | 20 min. | 7 | >200 | — | <1 | 7.4 |
| | 100° C. | 20 min. | 200 | — | — | 7.5 | 8.0 |
| 2 | RT | | — | 130 | — | — | — |
| | 100° C. | 20 min. | — | 110 | — | — | — |
| 3 | RT | | — | — | >200 | — | 9.8 |
| | 100° C. | 20 min. | — | — | >200 | — | 10.3 |

*Methyl ethyl ketone double rubs required to remove 50% of the coating.

The above examples are illustrative of the present invention. It is to be understood that these examples are not in any way to be interpreted as limiting the scope of the invention. Rather, it is intended that the scope of the invention be defined by the claims set forth below.

The composition of the present invention is maintained moisture free until coatings are prepared therefrom, suitably by storing the composition under an inert atmosphere such as nitrogen in a closed container. As a result, a shelf stability of typically more than about two months, is provided.

We claim:

1. A low temperature, moisture cure coating composition comprising (a) a crosslinkable, solvent borne, solution polymer containing from about 1 to 100 weight percent of repeating units derived from an activated ester-containing vinyl monomer of the formula

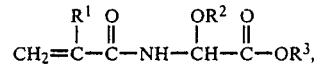

wherein the $R^1$ group is selected from H and $CH_3$, and the $R^2$ and $R^3$ groups are independently selected from alkyls of 1-6 carbon atoms, cycloalkyls of 5-6 carbon atoms, and 2-hydroxyalkyls of 2-6 carbon atoms; with any balance of repeating units derived from one or more copolymerizable ethylenically unsaturated comonomers; and (b) a ketimine made from a ketimine-forming ketone and a crosslinking agent having a plurality of primary amine groups, each capable when in the free amine form of replacing the $OR^3$ moiety by nucleophilic substitution, the ketimine being present in an amount sufficient to produce a crosslinked polymer when said primary amine groups are in said free amine form.

2. The coating composition of claim 1, wherein the polymer contains about 20–35 weight percent of said repeating units derived from said activated ester-containing vinyl monomer.

3. The coating composition of claim 1, wherein said activated ester-containing vinyl monomer is methyl acrylamidoglycolate methyl ether.

4. The coating composition of claim 1, wherein the polymer contains about 20–35 weight percent of repeating units derived from methyl acrylamidoglycolate methyl ether.

5. The coating composition of claim 1, wherein said crosslinking agent has two to four of said primary amine groups.

6. The coating composition of claim 1, wherein the ketone is a branched ketone.

7. The coating composition of claim 1, wherein the ketone is methyl isobutyl ketone.

8. A crosslinked coating obtained by curing the composition of claim 1.

9. The coating composition of claim 1, wherein the ketone is an unbranched ketone.

10. The coating composition of claim 1, wherein the ketone is methyl ethyl ketone.

* * * * *